US011995480B2

(12) United States Patent
Iyer et al.

(10) Patent No.: US 11,995,480 B2
(45) Date of Patent: May 28, 2024

(54) SYSTEMS AND METHODS FOR ADAPTIVE WIRELESS FORWARD AND BACK CHANNEL SYNCHRONIZATION BETWEEN INFORMATION HANDLING SYSTEMS

(71) Applicant: Dell Products L.P., Round Rock, TX (US)

(72) Inventors: Vivek Viswanathan Iyer, Austin, TX (US); Daniel L. Hamlin, Round Rock, TX (US); Manuel Novoa, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 17/018,501

(22) Filed: Sep. 11, 2020

(65) Prior Publication Data

US 2022/0083399 A1    Mar. 17, 2022

(51) Int. Cl.
*G06F 9/52*    (2006.01)
*G06F 9/30*    (2018.01)
*H04L 67/1095*    (2022.01)

(52) U.S. Cl.
CPC ............ *G06F 9/52* (2013.01); *G06F 9/30087* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 8,675,717 B1* | 3/2014 | Yuan | H04B 1/38 375/267 |
| 10,085,216 B1* | 9/2018 | Younis | H04R 1/1041 |
| 2002/0095679 A1* | 7/2002 | Bonini | H04N 21/4788 348/E7.083 |
| 2002/0184038 A1* | 12/2002 | Costello | H04H 60/07 704/500 |
| 2004/0234018 A1* | 11/2004 | Ram | H04B 7/18528 375/354 |
| 2005/0085259 A1* | 4/2005 | Conner | H04B 3/542 455/552.1 |
| 2006/0053196 A1* | 3/2006 | Spataro | H04L 65/403 709/205 |
| 2007/0097873 A1* | 5/2007 | Ma | H04W 28/18 370/252 |
| 2007/0242062 A1* | 10/2007 | Guo | G06F 3/14 345/204 |

(Continued)

*Primary Examiner* — Adam Lee
(74) *Attorney, Agent, or Firm* — Jackson Walker L.L.P.

(57) ABSTRACT

An information handling system may include a processor, a wireless network interface communicatively coupled to the processor, and a synchronization manager comprising a program of instructions embodied in non-transitory computer-readable media communicatively coupled to the processor, the synchronization manager configured to, when executed by the processor, in response to an event for communicating data via the wireless network interface between the information handling system and a second information handling system: (i) determine a context associated with the information handling system; (ii) determine a synchronization algorithm for the data based on the context and the type of data; and (iii) synchronize the data based on the synchronization algorithm.

6 Claims, 5 Drawing Sheets

(56) References Cited

U.S. PATENT DOCUMENTS

| | | | |
|---|---|---|---|
| 2008/0075031 A1* | 3/2008 | Ohayon | H04N 21/6143 370/316 |
| 2008/0101466 A1* | 5/2008 | Swenson | H04N 21/2404 375/240.07 |
| 2009/0041088 A1* | 2/2009 | Yang | H04L 1/0072 375/E1.035 |
| 2010/0309839 A1* | 12/2010 | Goldshtein | H04B 7/18591 370/316 |
| 2011/0066752 A1* | 3/2011 | Lippincott | H04L 43/0894 709/233 |
| 2012/0069748 A1* | 3/2012 | Van Den Bogaert | H04W 36/0088 370/252 |
| 2012/0114022 A1* | 5/2012 | Lever | H04B 7/18541 375/214 |
| 2012/0197998 A1* | 8/2012 | Kessel | H04L 67/1095 709/205 |
| 2012/0296656 A1* | 11/2012 | Smyth | G10L 19/22 704/E21.001 |
| 2012/0296658 A1* | 11/2012 | Smyth | G10L 19/22 704/500 |
| 2013/0060841 A1* | 3/2013 | Knight | G06F 16/437 709/203 |
| 2013/0229979 A1* | 9/2013 | Liu | H04L 1/1893 370/328 |
| 2014/0233376 A1* | 8/2014 | Yu | H04W 28/06 370/230 |
| 2014/0365636 A1* | 12/2014 | Denner | H04L 43/00 709/224 |
| 2015/0223098 A1* | 8/2015 | Sze | H04L 43/0829 370/235 |
| 2015/0295808 A1* | 10/2015 | O'Malley | H04L 43/10 709/224 |
| 2016/0282232 A1* | 9/2016 | Murphy | H04W 4/70 |
| 2016/0292111 A1* | 10/2016 | Doo | G06F 13/3625 |
| 2017/0164223 A1* | 6/2017 | Guo | G06F 11/07 |
| 2017/0193182 A1* | 7/2017 | Mihai | G16H 80/00 |
| 2017/0215171 A1* | 7/2017 | Sun | H04W 72/14 |
| 2019/0190556 A1* | 6/2019 | Sheahan | H03M 1/0624 |

* cited by examiner

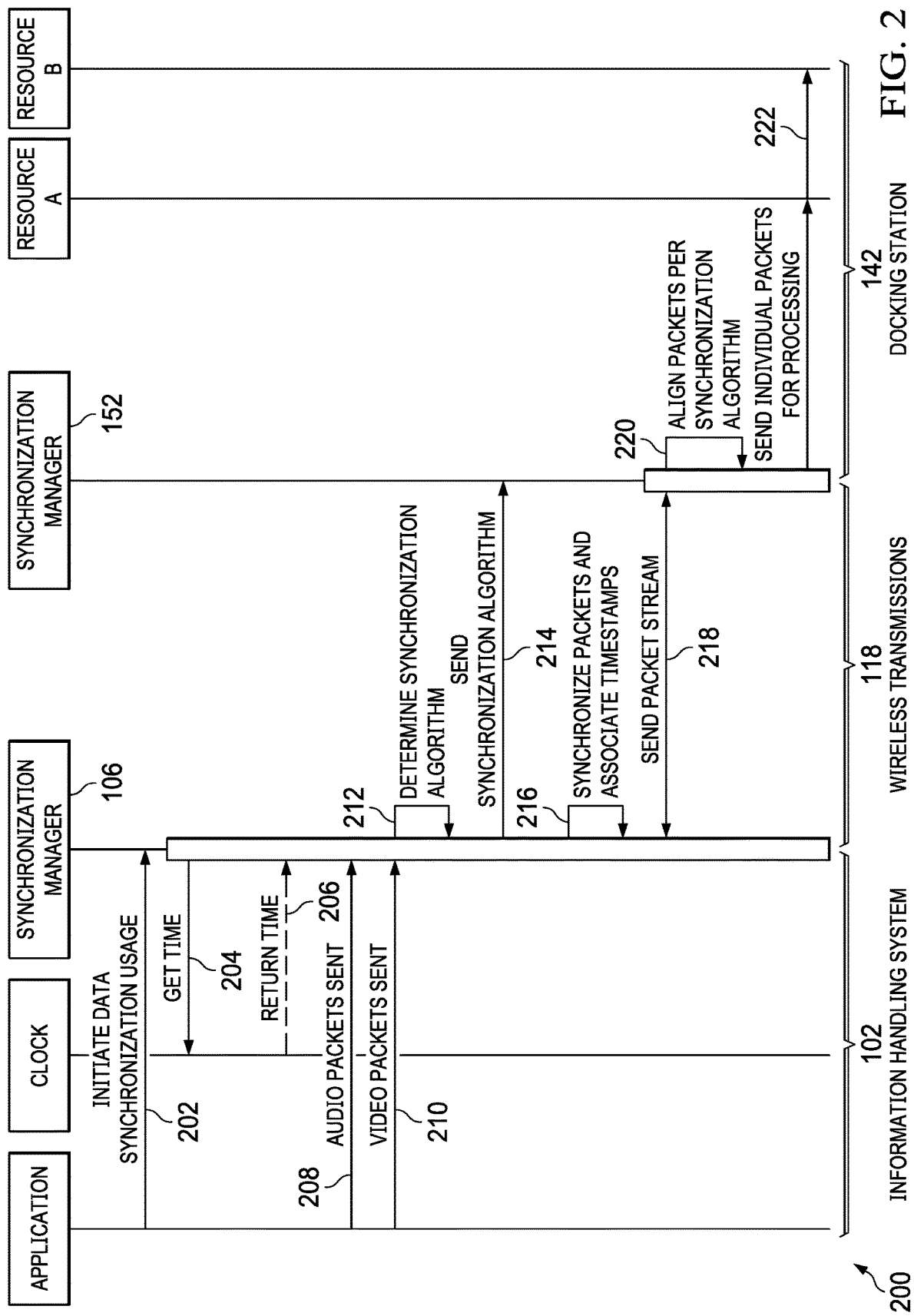

CONTEXT
- WIRELESS PARAMETERS
- USER CONTEXT (FOREGROUND APPLICATION, ETC)
- INFORMATION HANDLING SYSTEM 102 (HINGE, POSTURE, ETC)

⇩ INFERENCE

|  | FORWARD CHANNEL VIDEO | FORWARD CHANNEL AUDIO | FORWARD CHANNEL PERIPHERAL PAYLOAD | BACK CHANNEL PERIPHERAL ACKNOWLEDGMENT |
|---|---|---|---|---|
| FORWARD CHANNEL VIDEO | X | TIGHT AV SYNCHRONIZATION WITHIN 30 msec TOLERANCE | N/A BUT SET PACKET PRIORITIES APPROPRIATELY | LOOSE SYNCHRONIZATION LESS THAN 1 SECOND |
| FORWARD CHANNEL AUDIO | TIGHT AV SYNCHRONIZATION WITHIN 30 msec TOLERANCE | X | LOOSE SYNCHRONIZATION LESS THAN 1 SECOND | LOOSE SYNCHRONIZATION LESS THAN 1 SECOND |

FIG. 3

SYSTEMS AND METHODS FOR ADAPTIVE WIRELESS FORWARD AND BACK CHANNEL SYNCHRONIZATION BETWEEN INFORMATION HANDLING SYSTEMS

TECHNICAL FIELD

The present disclosure relates in general to information handling systems, and more particularly systems and methods for adaptive wireless forward and back channel synchronization between information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A user of an information handling system may couple, either via a wired or wireless connection, the information handling system to a docking station, which may also be referred to as a port replicator or dock. A docking station may comprise a system, device, or apparatus that enables a coupled information handling system to communicatively couple to information handling resources (e.g., keyboard, monitor, mouse, external storage resources, network interfaces, etc.) attached to or integral to the docking station.

Wireless docking stations that provide a wireless interface between an information handling system and the wireless docking station are becoming increasingly preferable, as they do not require cumbersome wired connections to couple the information handling system to the wireless docking station. Such wireless interface may be used for purposes of discovery, authentication, control, data communication, and other capabilities.

Wireless communication between a docking station and information handling system may comprise forward channel communication and back channel communication. Forward channel communication may include information communicated from an information handling system to a docking station. Examples of forward channel communication may include:

the encoding and packetization of audio data from the information handling system to the docking station, to be decoded by the docking station and rendered through audio peripherals coupled to the docking station (e.g., headphones, speakers);

the encoding and packetization of video data from the information handling system to the docking station, to be decoded by the docking station and rendered to one or more display devices coupled to the docking station;

control commands from the information handling system to the docking station (e.g., out-of-band manageability protocols);

responses to back channel communications (e.g., acknowledgments); and other miscellaneous traffic such as peripheral (e.g., printer) payloads communication from the information handling system to the docking station, to peripherals coupled to the docking station (e.g., printing a file).

Back channel communication may include information communicated from the docking station to the information handling system. Examples of back channel communication may include:

communication, from the docking station to the information handling system, of Media-Agnostic Universal Serial Bus (MA-USB) information received by the docking station from peripherals coupled to the docking station either wirelessly or via wired connection;

communication, from the docking station to the information handling system, of video or other payload information received by the docking station from peripherals coupled to the docking station (e.g., camera, Universal Serial Bus hard drive, smart card reader, microphone, etc.); and user presence information, indication of activation of remote power button, indication of remote privacy button trigger, or other events from peripherals coupled to the docking station (e.g., "smart" peripherals such as a display device with user presence sensor or other sensor).

In both forward channel and back channel communication, it is critical to keep all of the different types of traffic between the docking station and the information handling system, such as synchronization of audio and video for playback of audio-visual material. Such synchronization may become challenging in environments with varying packet loss, such as crowded wireless environments (e.g., in an office cubicle environment) where significant communication interference may exist. Similar problems exist in the back channel (e.g., maintaining synchronization of keyboard, mouse, and video peripheral). Further, in some situations, it may be critical to keep back channel traffic in synchronization in response to forward channel traffic, and vice versa (e.g., synchronization with respect to round-trip latency between rendering mouse clicks, as unnatural delays between mouse clicks and display refresh in response to mouse click may lead to negative user experience).

SUMMARY

In accordance with the teachings of the present disclosure, the disadvantages and problems associated with secure discovery and wake of an information handling system interfacing with a wireless docking station may be reduced or eliminated.

In accordance with embodiments of the present disclosure, an information handling system may include a processor, a wireless network interface communicatively coupled to the processor, and a synchronization manager comprising a program of instructions embodied in non-transitory computer-readable media communicatively coupled to the processor, the synchronization manager configured to, when executed by the processor, in response to an event for communicating data via the wireless network interface between the information handling system and a second information handling system: (i) determine a context associated with the information handling system; (ii) determine a synchronization algorithm for the data based on the context and the type of data; and (iii) synchronize the data based on the synchronization algorithm.

In accordance with these and other embodiments of the present disclosure, a method may include, in an information handling system, in response to an event for communicating data via a wireless network interface between the information handling system and a second information handling system: (i) determining a context associated with the information handling system; (ii) determining a synchronization algorithm for the data based on the context and the type of data; and (iii) synchronizing the data based on the synchronization algorithm.

In accordance with these and other embodiments of the present disclosure, an article of manufacture may include a computer readable medium and computer-executable instructions carried on the computer readable medium, the instructions readable by a processor, the instructions, when read and executed, for causing the processor to, in an information handling system, in response to an event for communicating data via a wireless network interface between the information handling system and a second information handling system: (i) determine a context associated with the information handling system; (ii) determine a synchronization algorithm for the data based on the context and the type of data; and (iii) synchronize the data based on the synchronization algorithm.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a flow chart of an example method for adaptive forward channel synchronization between an information handling system and a wireless docking station, in accordance with certain embodiments of the present disclosure;

FIG. 3 illustrates a method for determining forward channel synchronization based on a context, in accordance with embodiments of the present disclosure;

DETAILED DESCRIPTION

Figure 1:
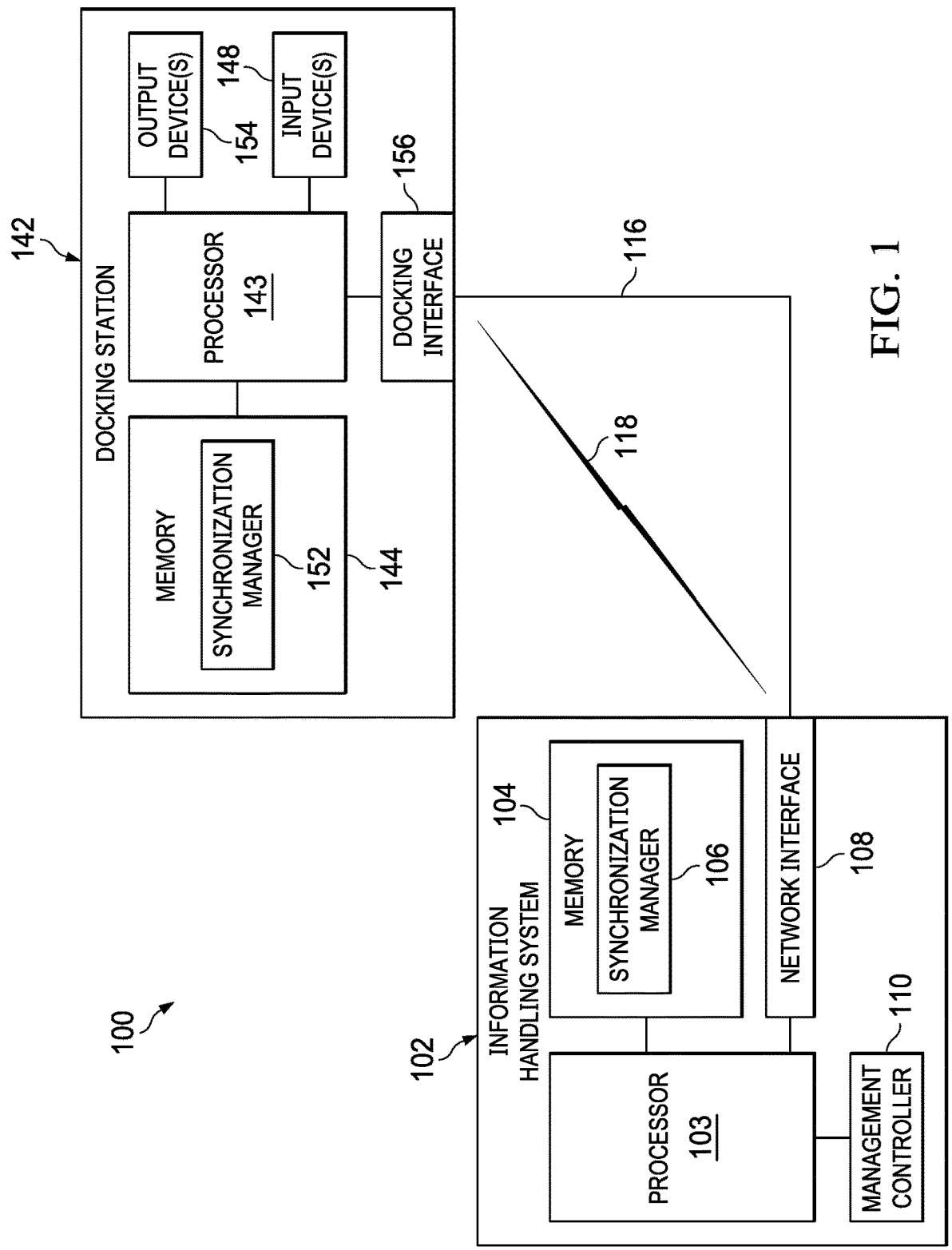
FIG. 1 illustrates a block diagram of an example system including an information handling system and a wireless docking station, in accordance with certain embodiments of the present disclosure.

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), IEEE 802.11ad (Wireless Gigabit or "WiGig"), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, etc.

FIG. 1 illustrates a block diagram of an example system 100 including an information handling system 102 and a wireless docking station 142, in accordance with certain embodiments of the present disclosure.

In some embodiments, information handling system 102 may be a personal computer. In particular embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, and a network interface 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource, and/or another component of information handling system 102.

Memory 104 may include any system, device, or apparatus configured to retain data (including program instructions) for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon a synchronization manager 106. Synchronization manager 106 may comprise any suitable system, device, or apparatus configured to perform adaptive forward and back channel synchronization between information handling system 102 and docking station 142, as described in greater detail below. Accordingly, synchronization manager 106 may comprise a program of executable instructions that may be stored in memory 104, and loaded and executed by processor 103 to implement a software service that executes the functionality of synchronization manager 106.

Network interface 108 may comprise any suitable system, apparatus, or device operable to serve as an interface between information handling system 102 and another information handling system and/or a network. Network interface 108 may enable information handling system 102 to communicate using any suitable transmission protocol and/or standard. In some embodiments, network interface 108 may be configured to communicate with docking interface 156 of docking station 142 via wire-line transmissions 116. In these or other embodiments, network interface 108 may be configured to communicate with docking interface 156 of docking station 142 via wireless transmissions 118. In these and other embodiments, network interface 108 may comprise a network interface card, or "NIC."

In addition to processor 103, memory 104, and network interface 108, information handling system 102 may include one or more other information handling resources.

Docking station 142 may comprise a docking station, port replicator, or dock that allows information handling system 102 or another electronic device to communicatively couple to information handling resources (e.g., keyboard, monitor, mouse, external storage resources, network interfaces, etc.) attached to or integral to docking station 142. Docking station 142 may allow information handling system 102 to communicatively couple to docking station 142 (and thus the devices communicatively coupled to docking station 142) via wire-line transmissions 116 and/or wireless transmissions 118 communicated between network interface 108 and docking interface 156. In some embodiments, docking station 142 may comprise an information handling system, albeit with functionality and/or structure different than that of information handling system 102. As depicted in FIG. 1, docking station 142 may include a processor 143, a memory 144 communicatively coupled to processor 143, one or more input devices 148 communicatively coupled to processor 143, one or more output devices 154 communicatively coupled to processor 143, and a docking interface 156 communicatively coupled to processor 143.

Processor 143 may include any system, device, or apparatus configured to interpret and/or execute program instructions and/or process data, and may include, without limitation, a microprocessor, microcontroller, DSP, ASIC, or any other digital or analog circuitry configured to interpret and/or execute program instructions and/or process data. In some embodiments, processor 143 may interpret and/or execute program instructions and/or process data stored in memory 144 and/or another component of docking station 142.

Memory 144 may be communicatively coupled to processor 143 and may include any system, device, or apparatus configured to retain program instructions and/or data for a period of time (e.g., computer-readable media). Memory 144 may include RAM, EEPROM, a PCMCIA card, flash memory, magnetic storage, opto-magnetic storage, or any suitable selection and/or array of volatile or non-volatile memory that retains data after power to docking station 142 is turned off. Memory 144 may be either internal or external to docking station 142.

As shown in FIG. 1, memory 144 may have stored thereon a synchronization manager 152. Synchronization manager 152 may comprise any suitable system, device, or apparatus configured to, alone or in concert with synchronization manager 106, perform adaptive forward and back channel synchronization between information handling system 102 and docking station 142, as described in greater detail below. Accordingly, synchronization manager 152 may comprise a program of executable instructions that may be stored in memory 144, and loaded and executed by processor 143 to implement a software service that executes the functionality of synchronization manager 152.

Input devices 148 may comprise any system, device, or apparatus configured to receive user input or an indication of user input. For example, input devices 148 may include a power button, keyboard, mouse, microphone, and/or other suitable input device.

Output devices 154 may comprise any system, device, or apparatus configured to output information in the form of visual information, audible information, printed information, and/or other suitable manner. For example, output devices 154 may include a display device, an audio transducer (e.g. speaker of headphone), a printer, and/or other suitable output device.

Docking interface 156 may comprise any suitable system, apparatus, or device operable to serve as a communications interface between docking station 142 and network interface 108 of information handling system 102. Docking interface 156 may be configured to communicate with network interface 108 of information handling system 102 via wire-line transmissions 116 and/or wireless transmissions 118.

In addition to processor 143, memory 144, and docking interface 156, docking station 142 may include one or more other information handling resources.

In operation, synchronization manager 106 of information handling system 102 may generate timestamps for forward channel traffic (e.g., from an atomic time source incremented at suitable frame rates for relevant traffic) and communicate such timestamps to docking station 142 via wireless transmissions 118. In some embodiments, such timestamps may be communicated as part of an out-of-band packet payload communicated from information handling system 102 to docking station 142. In addition, synchronization manager 106 may receive all decoded timestamps for back channel traffic communicated from docking station 142. Based on a context associated with information handling system 102, synchronization manager 106 may generate a determination of a type of synchronization to use for forward channel use cases (including use cases in which back channel data is to be synchronized in response to forward channel events). Such context may include packet loss statistics associated with wireless transmissions 118, packet errors, bit errors, user context such as execution of foreground applications, and/or other parameters. Such determination of synchronization type may be based on a simple rules engine, based on a machine learning algorithm, or other suitable approach. Further, synchronization manager 106 may apply standard algorithms for synchronization catch-up or retard in accordance with the determined type of synchronization.

Similarly, in operation, synchronization manager 152 of docking station 142 may generate timestamps for back channel traffic (e.g., from an atomic time source incremented at suitable frame rates for relevant traffic) and communicate such timestamps to information handling system 102 via wireless transmissions 118. In some embodiments, such timestamps may be communicated as part of an out-of-band packet payload communicated from information handling system 102 to docking station 142. In addition, synchronization manager 152 may be configured to perform an out-of-band check for atomic time source synchronization between information handling system 102 and docking station 142, to ensure synchronization is within known given transmission and reception delays in a networking stack. Additionally, synchronization manager 152 may periodically receive from information handling system 102, via wireless transmissions 118, context information generated by synchronization manager 106. Based on such context information, in addition to local context regarding intelligent peripherals connected to docking station 142 (e.g., remote power button on display device), synchronization manager 106 may generate a determination of a type of synchronization to use for back channel use cases (including use cases in which forward channel data is to be synchronized in response to back channel events). Further, synchronization manager 152 may apply standard algorithms for synchronization catch-up or retard in accordance with the determined type of synchronization.

FIG. 2 illustrates a flow chart of an example method 200 for adaptive forward channel synchronization between information handling system 102 and wireless docking station 142, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, an application executing on information handling system 102 may execute functionality (e.g., playback of audio/visual information) that initiates a need for data synchronization, and communicate an appropriate indication to synchronization manager 106. In response, at step 204, synchronization manager 106 may obtain a time from a clock of information handling system 102. At step 206, the clock may return the time to synchronization manager 106.

At step 208, the application may communicate audio packet information to synchronization manager 106. At step 210, the application may communicate video packet information to synchronization manager 106.

At step 212, based on a context associated with information handling system 102, synchronization manager 106 may determine a synchronization algorithm for forward channel communication. An example of determining synchronization algorithms for forward channel communication is depicted in FIG. 3. As shown in FIG. 3, based on a context of parameters associated with information handling system 102, synchronization manager 106 may make an inference regarding synchronization of data communicated in forward channel communication, and determine a synchronization algorithm for the forward channel data (or back channel data responsive to forward channel data) based on the type of forward channel data.

Turning again to FIG. 2, at step 214, synchronization manager 106 may communicate the synchronization algorithm to synchronization manager 152 via wireless transmissions 118. At step 216, synchronization manager 106 may synchronize the forward channel packets and associate their various timestamps.

At step 218, synchronization manager 106 may communicate the forward channel packet stream to synchronization manager 152 via wireless transmissions 118.

At step 220, synchronization manager 152 may align the forward channel packets in accordance with the synchronization algorithm determined by synchronization manager 106. At step 222, in accordance with the alignment, synchronization manager 152 may communicate individual packets for processing at resources of docking station 142 (e.g., at output devices 154 such as a video display device and an audio speaker).

After completion of step 222, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Figure 4:
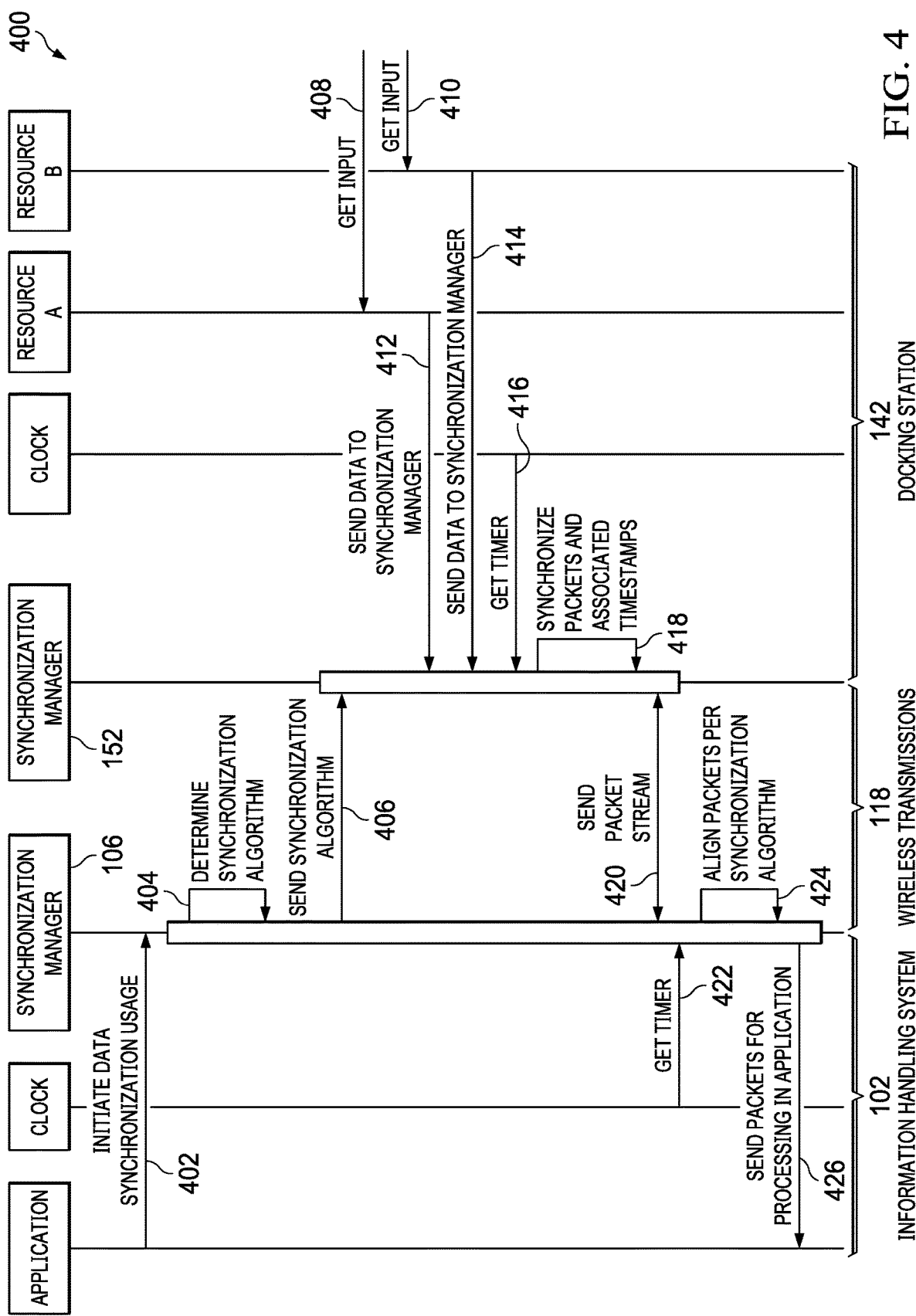
FIG. 4 illustrates a flow chart of an example method for adaptive back channel synchronization between an information handling system and a wireless docking station, in accordance with certain embodiments of the present disclosure.

FIG. 4 illustrates a flow chart of an example method 400 for adaptive back channel synchronization between information handling system 102 and wireless docking station 142, in accordance with certain embodiments of the present disclosure. According to one embodiment, method 400 may begin at step 402. As noted above, teachings of the present disclosure may be implemented in a variety of configurations of system 100. As such, the preferred initialization point for method 400 and the order of the steps comprising method 400 may depend on the implementation chosen.

Figure 5:
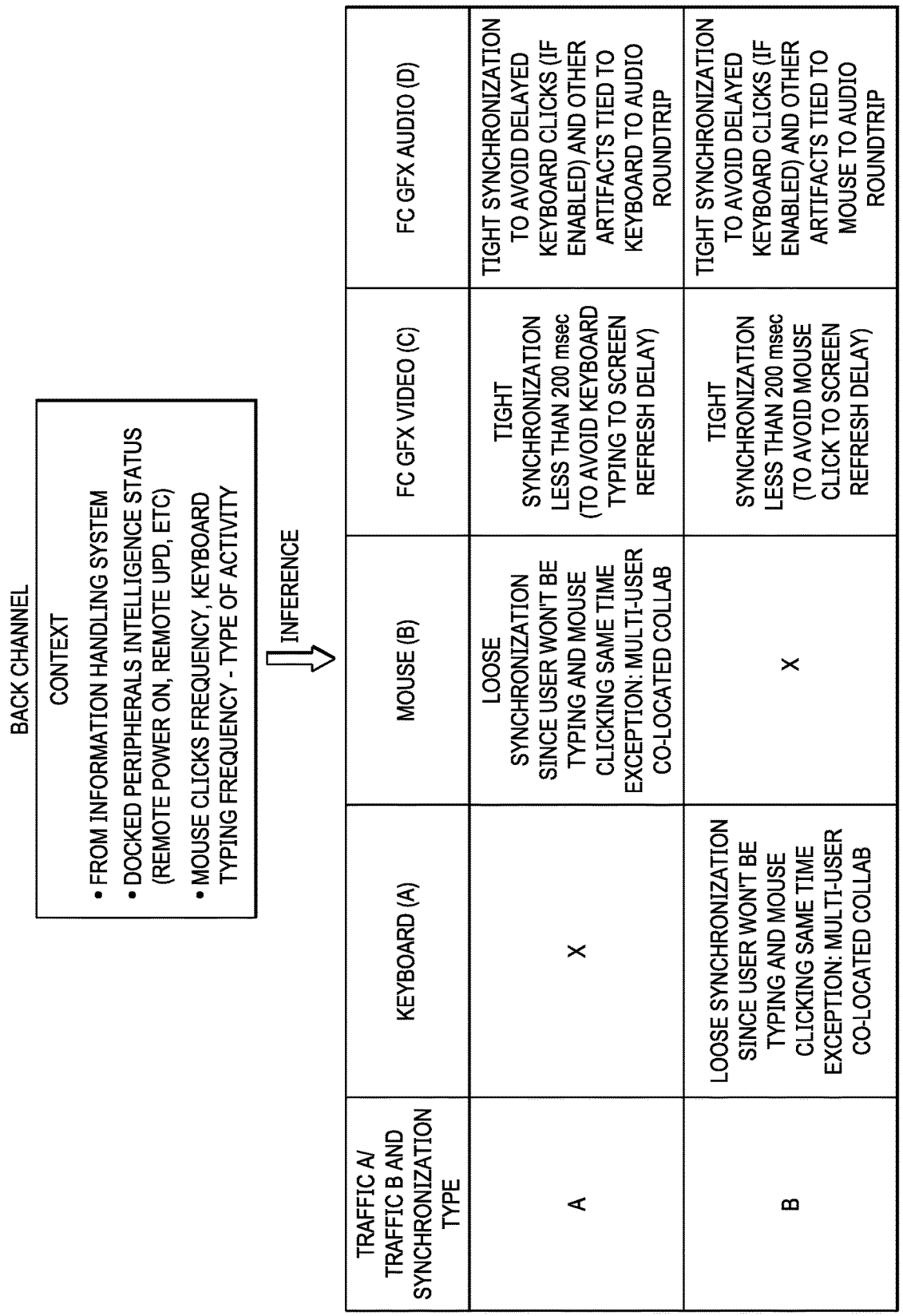
FIG. 5 illustrates a method for determining back channel synchronization based on a context, in accordance with embodiments of the present disclosure.

At step 402, an application executing on information handling system 102 may execute functionality (e.g., playback of audio/visual information) that initiates a need for data synchronization, and communicate an appropriate indication to synchronization manager 106. At step 404, based on a context associated with information handling system 102 and/or a context associated with docking station 142, synchronization manager 106 may determine a synchronization algorithm for back channel communication. An example of determining synchronization algorithms for back channel communication is depicted in FIG. 5. As shown in FIG. 5, based on a context of parameters associated with information handling system 102, synchronization manager 106 may make an inference regarding synchronization of data communicated in back channel communication, and determine a synchronization algorithm for the back channel data (or forward channel data responsive to back channel data) based on the type of back channel data.

Turning again to FIG. 4, at step 406, synchronization manager 106 may communicate the synchronization algorithm to synchronization manager 152 via wireless transmissions 118.

At step 408, synchronization manager 152 may receive data from a first resource (e.g., a network resource) coupled to docking station 142. At step 410 synchronization manager 152 may receive data from a second resource (e.g., a mouse) coupled to docking station 142.

At step 412, synchronization manager 152 may receive the data from the first resource. At step 414, synchronization manager 152 may receive the data from the second resource.

At step 416, synchronization manager 152 may obtain a time from a clock of docking station 142. At step 418, synchronization manager 152 may synchronize the back channel packets and associate their various timestamps.

At step 420, synchronization manager 152 may communicate the back channel packet stream to synchronization manager 106 via wireless transmissions 118.

At step 422, synchronization manager 106 may obtain a time from a clock of information handling system 102. At step 424, synchronization manager 106 may align the back channel packets in accordance with the synchronization algorithm determined by synchronization manager 106. At step 426, in accordance with the alignment, synchronization manager 152 may communicate individual packets for processing by an application executing on information handling system 102.

After completion of step 426, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software and/or firmware embodied in computer-readable media.

Although the foregoing, for the purposes of clarity and exposition, contemplates adaptive forward channel and back channel synchronization between an information handling system and a docking station, in some embodiments, methods and systems similar or identical to those described above may be used to facilitate adaptive forward channel and back channel synchronization between a first information handling system (e.g., information handling system 102) and a second information handling system (e.g., an information handling system implementing docking station 142 or an information handling system present in lieu of docking station 142).

Using the systems and methods described above, forward channel and back channel synchronization between information handling systems may be enabled that is contextual in nature and may adapt to conditions of a communications channel.

For clarity and exposition, the foregoing contemplates the communicative coupling of a single information handling system 102 to a single docking station 142. However, in some embodiments, a single information handling system 102 may be capable of coupling to more than one docking station 142. Likewise, in some embodiments, a single docking station 142 may be capable of coupling to more than one information handling system 102.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a wireless network interface communicatively coupled to the processor; and
   a synchronization manager comprising a program of instructions embodied in non-transitory computer-readable media communicatively coupled to the processor, the synchronization manager configured to, when executed by the processor, in response to an event for wireless transmissions via the wireless network interface between the information handling system and a second information handling system:
   generate timestamps for forward channel traffic, wherein the forward channel traffic includes audio packet data and video packet data;
   wirelessly transmit the forward channel traffic and the timestamps for the forward channel traffic to the second information handling system;
   wirelessly transmit a first type of synchronization algorithm for the forward channel traffic to the second information handling system, wherein the first type of synchronization algorithm is based on statistics associated with the wireless transmissions and execution of foreground applications, and wherein the statistics include packet loss statistics, packet error statistics, and bit error statistics;
   apply a synchronization catch-up and/or retard to the forward channel traffic in accordance with the first type of synchronization algorithm;
   wirelessly receive back channel traffic and timestamps for the back channel traffic from the second information handling system;
   wirelessly transmit a second type of synchronization algorithm for the back channel traffic to the second information handling system, wherein the second type of synchronization algorithm is based on a status of a peripheral connected to the second information handling system and a type of activity received from the peripheral; and
   apply a synchronization catch-up and/or retard to the back channel traffic in accordance with the second type of synchronization algorithm.

2. The information handling system of claim 1, wherein the second information handling system is a wireless docking station.

3. A method comprising, in an information handling system, in response to an event for wireless transmissions via a wireless network interface between the information handling system and a second information handling system:
   generating timestamps for forward channel traffic, wherein the forward channel traffic includes audio packet data and video packet data;
   wirelessly transmitting the forward channel traffic and the timestamps for the forward channel traffic to the second information handling system;
   wirelessly transmitting a first type of synchronization algorithm for the forward channel traffic to the second information handling system, wherein the first type of synchronization algorithm is based on statistics associated with the wireless transmissions and execution of foreground applications, and wherein the statistics include packet loss statistics, packet error statistics, and bit error statistics;
   applying a synchronization catch-up and/or retard to the forward channel traffic in accordance with the first type of synchronization algorithm;
   wirelessly receiving back channel traffic and timestamps for the back channel traffic from the second information handling system;
   wirelessly transmitting a second type of synchronization algorithm for the back channel traffic to the second information handling system, wherein the second type of synchronization algorithm is based on a status of a peripheral connected to the second information handling system and a type of activity received from the peripheral; and
   applying a synchronization catch-up and/or retard to the back channel traffic in accordance with the second type of synchronization algorithm.

4. The method of claim 3, wherein the second information handling system is a wireless docking station.

5. An article of manufacture comprising:
   a non-transitory computer readable medium; and
   computer-executable instructions carried on the computer readable medium, the instructions readable by a processor, the instructions, when read and executed, for causing the processor to, in an information handling system, in response to an event for wireless transmissions via a wireless network interface between the information handling system and a second information handling system:
   generate timestamps for forward channel traffic, wherein the forward channel traffic includes audio packet data and video packet data;
   wirelessly transmit the forward channel traffic and the timestamps for the forward channel traffic to the second information handling system;
   wirelessly transmit a first type of synchronization algorithm for the forward channel traffic to the second information handling system, wherein the first type of synchronization algorithm is based on statistics associated with the wireless transmissions and execution of foreground applications, and wherein the statistics include packet loss statistics, packet error statistics, and bit error statistics;

apply a synchronization catch-up and/or retard to the forward channel traffic in accordance with the first type of synchronization algorithm;

wirelessly receive back channel traffic and timestamps for the back channel traffic from the second information handling system;

wirelessly transmit a second type of synchronization algorithm for the back channel traffic to the second information handling system, wherein the second type of synchronization algorithm is based on a status of a peripheral connected to the second information handling system and a type of activity received from the peripheral; and apply a synchronization catch-up and/or retard to the back channel traffic in accordance with the second type of synchronization algorithm.

6. The article of manufacture of claim 5, wherein the second information handling system is a wireless docking station.

* * * * *